US009459603B2

(12) United States Patent
Brinkley

(10) Patent No.: US 9,459,603 B2
(45) Date of Patent: Oct. 4, 2016

(54) TACTICAL ILLUSION DEVICE AND RELATED METHODS

(71) Applicant: Ken Brinkley, Williamstown, KY (US)

(72) Inventor: Ken Brinkley, Williamstown, KY (US)

(73) Assignee: ATID, LLC, Florence, KY (US)

( * ) Notice: Subject to any disclaimer, the term of this patent is extended or adjusted under 35 U.S.C. 154(b) by 490 days.

(21) Appl. No.: 13/935,613

(22) Filed: Jul. 5, 2013

(65) Prior Publication Data
US 2014/0309783 A1    Oct. 16, 2014

Related U.S. Application Data

(60) Provisional application No. 61/811,799, filed on Apr. 14, 2013.

(51) Int. Cl.
G05B 13/02 (2006.01)
G05B 13/04 (2006.01)
G05B 15/02 (2006.01)
G08B 15/00 (2006.01)

(52) U.S. Cl.
CPC .............. *G05B 15/02* (2013.01); *G08B 15/002* (2013.01)

(58) Field of Classification Search
CPC  G05B 15/02; G05B 19/042; H05B 37/0227; G08B 15/002
USPC ......................................... 700/275
See application file for complete search history.

(56) References Cited

U.S. PATENT DOCUMENTS

| | | | | | |
|---|---|---|---|---|---|
| 4,232,725 | A | * | 11/1980 | Gidge | E06B 3/80 160/332 |
| 4,644,990 | A | * | 2/1987 | Webb, Sr. | E06B 9/32 160/176.1 P |
| 4,970,489 | A | * | 11/1990 | Jenkins | G08B 15/002 340/309.8 |
| 4,979,550 | A | * | 12/1990 | Long | E06B 9/32 160/5 |
| 5,408,044 | A | * | 4/1995 | Spiegel | H01H 9/025 174/520 |
| 5,765,440 | A | * | 6/1998 | Yang | F16H 55/24 74/409 |
| 7,653,589 | B1 | * | 1/2010 | Schluetter | G06Q 40/00 705/37 |
| 8,905,900 | B1 | * | 12/2014 | Scaringi | A63B 69/16 482/57 |
| 8,950,461 | B2 | * | 2/2015 | Adams | E06B 9/32 160/1 |
| 2005/0052265 | A1 | * | 3/2005 | Vladimirescu | H01F 7/1615 335/229 |
| 2010/0033121 | A1 | * | 2/2010 | Dill | E06B 9/32 318/484 |
| 2010/0271296 | A1 | * | 10/2010 | Kopychev | A61M 1/14 345/156 |
| 2012/0073765 | A1 | * | 3/2012 | Hontz | E06B 9/304 160/84.02 |
| 2012/0125543 | A1 | * | 5/2012 | Chambers | E05F 15/79 160/5 |
| 2013/0024010 | A1 | * | 1/2013 | Dill | G05B 11/01 700/11 |
| 2013/0057937 | A1 | * | 3/2013 | Berman | E06B 9/68 359/230 |
| 2014/0109821 | A1 | * | 4/2014 | Rufo | F16F 1/025 114/337 |
| 2014/0117786 | A1 | * | 5/2014 | Gosvener | H02K 7/075 310/23 |

\* cited by examiner

*Primary Examiner* — Robert Fennema
*Assistant Examiner* — Jigneshkumar Patel
(74) *Attorney, Agent, or Firm* — Wood, Herron & Evans, LLP

(57) ABSTRACT

An apparatus for providing an illusion of occupancy is provided. The apparatus includes a prime mover having a shaft configured to receive an actuator, an actuator configured to interface the prime mover to an illusion target, and a microcontroller having a memory operatively coupled to selectably operate the prime mover. The microcontroller is configured with a first value representing an average time between a plurality of first movements of the prime mover, a second value representing an average time between the first movement and a second movement of the prime mover, and a third value representing a quantity of random variability to be applied to the first value and the second value. The microcontroller is further configured to operate the prime mover in accordance with the first value, the second value, and the third value, thereby manipulating the illusion target and providing the illusion of occupancy.

20 Claims, 5 Drawing Sheets

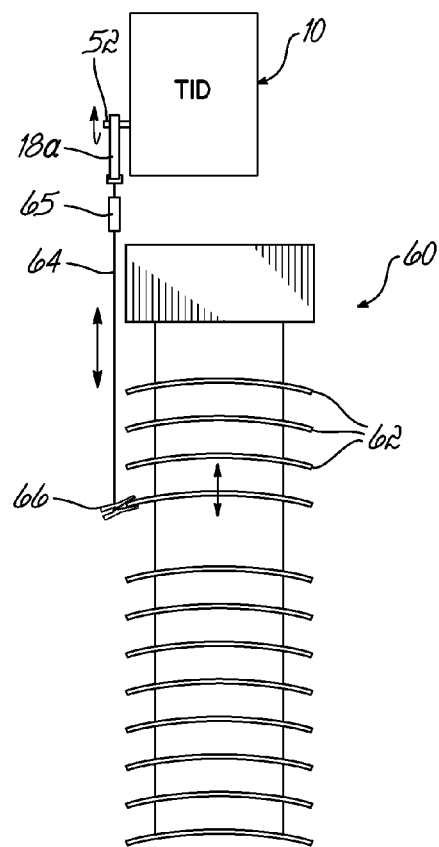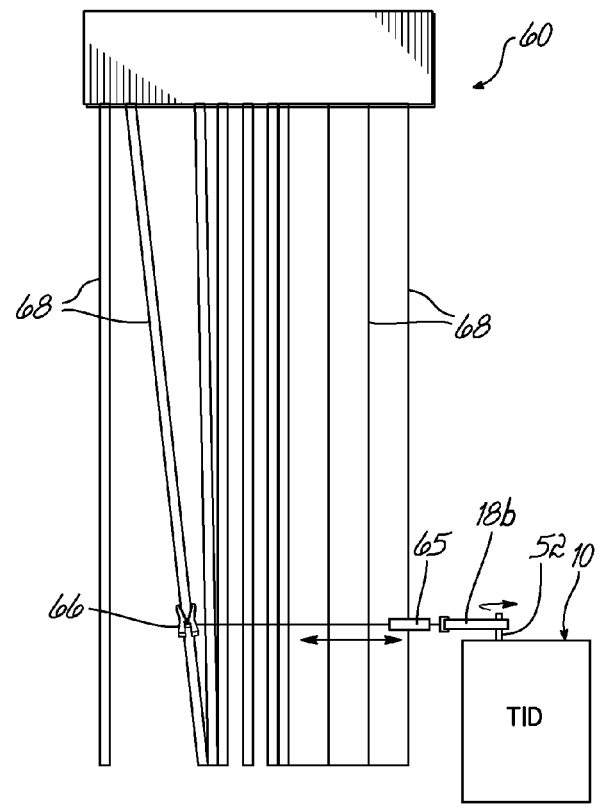
FIG. 3A  FIG. 3B
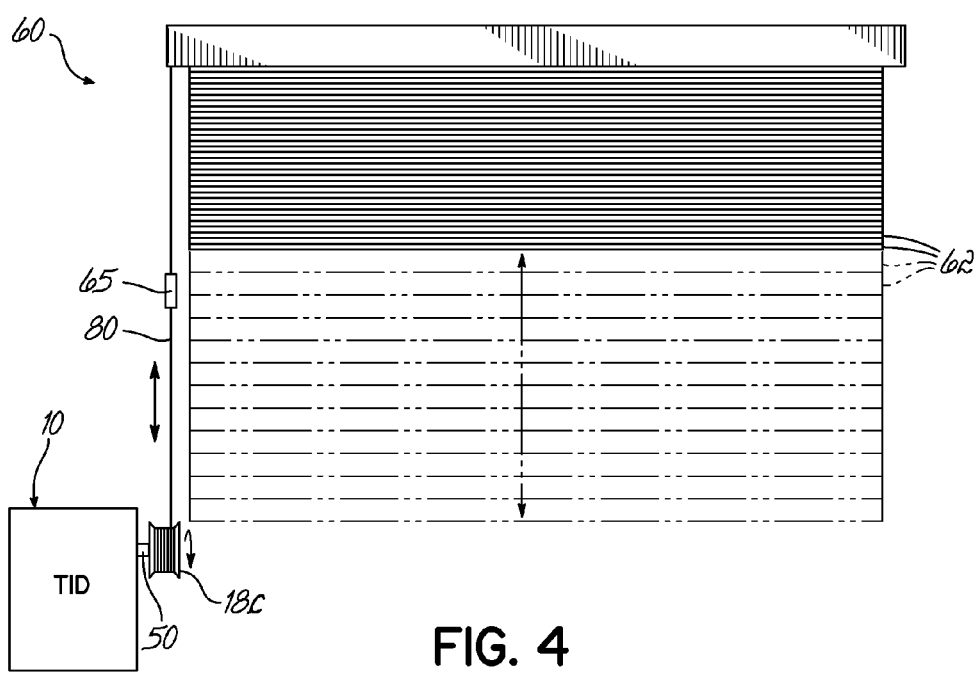
FIG. 4

TACTICAL ILLUSION DEVICE AND RELATED METHODS

CROSS REFERENCE TO RELATED APPLICATION

Pursuant to 37 C.F.R. §1.78(a)(4), this application claims the benefit of and priority to Provisional Application Ser. No. 61/811,799, filed Apr. 14, 2013, which is expressly incorporated herein by reference.

FIELD OF THE INVENTION

This invention relates to occupancy simulators. Specifically, the invention relates to apparatus and methods for manipulating inanimate objects to give the illusion that a structure, region, or area is occupied.

BACKGROUND OF THE INVENTION

In the context of security and crime detection, it is known that an occupied structure often deters intruders from attempting to enter the property or structure. With the exception of scenarios wherein the intruder's primary purpose is to do physical harm to the occupant, an intruder's desire to avoid detection often motivates him to choose vacant or unoccupied properties. Unfortunately, it is not always possible to keep a building occupied. Therefore, in those situations, it is desirable to give the illusion of occupancy to deter criminal activity.

One possible method of providing the illusion of occupancy is to employ a plug-in light timer. These devices use a mechanical or electrical timing mechanism to selectively energize and de-energize an integral switched receptacle. Therefore, a plug-in lamp may be turned on or off at selected times of the day or night. While this provides an improvement over the absence of any attempts to simulate occupancy, activating the light at fixed times allows an observer to decipher the pattern of operation and reveal the ruse. This device is also limited, in that it is rather difficult to simulate occupancy during daylight hours (inasmuch as it will be difficult for an outdoor observer to discern lights turning off or on when contrasted with daytime sun). Lastly, while hard-wired timers are available to replace wall switches (to control correspondingly hard-wired overhead lighting), they may require the aid of an electrician during installation (and they are quasi-permanent).

Another way of providing the illusion of occupancy is to use a television simulator device. Such devices are essentially panels of inexpensive colored Light Emitting Diodes (LEDs) which are adjusted by the unit to project blurred colored images on interior walls of a structure. This is intended to mimic the reflection of actual television images that would be visible to an observer situated outside of the building. These types of devices suffer from some of the same deficiencies noted above (difficult to perceive from outside during daylight sun, must be either left on continuously or cycled with a predictable timer, etc.).

Conversely, there are situations wherein the illusion of occupancy is desirable to attract the attention of aggressors. In an urban combat environment it may be desirable to create a tactical diversion for the purpose of drawing enemy fire or resources away from friendly forces. In those scenarios, it is desirable to give the illusion that a particular portion of a building is occupied though friendly forces are actually massed in an alternate location. Enemy attention and munitions will be wasted against the fictitious target, and friendly forces may safely egress, gather additional target indicators, or engage forces preoccupied with the diversion. In addition to the reasons noted above, existing technologies fail to function effectively because of the additional complexities and austerity of the combat environment. Electrical power may not be available in some structures, the device must be able to adapt to a variety of configurations and scenarios, and the device must have simple yet rugged controls.

Therefore, an apparatus and method for providing a realistic illusion of a human presence is needed for civilian and military environments.

SUMMARY OF THE INVENTION

The present invention provides an apparatus for providing an illusion of occupancy. The apparatus includes a prime mover having a shaft configured to receive an actuator, an actuator configured to interface the prime mover to an illusion target, and a microcontroller having a memory operatively coupled to selectably operate the prime mover. The microcontroller is configured with a first value representing an average time between a plurality of first movements of the prime mover, a second value representing an average time between the first movement and a second movement of the prime mover, and a third value representing a quantity of random variability to be applied to the first value and the second value. The microcontroller is further configured to operate the prime mover in accordance with the first value, the second value, and the third value, thereby manipulating the illusion target and providing the illusion of occupancy.

The invention also provides a method for providing an illusion of occupancy within an operating environment. The method includes selecting an illusion target for manipulation within the operating environment, choosing a first value representing an average time between a plurality of first movements of the illusion target, a second value representing an average time between the first movement and a second movement of the illusion target, and a third value representing a quantity of random variability to be applied to the first value and the second value. The method further includes manipulating the illusion target irrespective of actual human occupancy in the operating environment, in accordance with the first value, the second value, and the third value, thereby providing the illusion of occupancy.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3A is an illustration of the interface between an embodiment of the invention and horizontal mini-blinds (configured for micro movement).

FIG. 3B is an illustration of the interface between an embodiment of the invention and vertical blinds (configured for micro movement).

FIG. 4 is an illustration of the interface between an embodiment of the invention configured for linear style macro movement of blinds.

DETAILED DESCRIPTION

A tactical device for giving the illusion of occupancy will be explained herein. By nature of the varied environments in which the device will be deployed, a high degree of customizability has been designed into the device. A number of modifications to the device will be explored in detail, so that one of ordinary skill will appreciate its ability to interface with plural mechanisms and its capacity to accomplish multiple user objectives. These detailed embodiments are intended to be exemplary, and should in no way be construed as limiting the scope of the larger inventive concept.

Figure 1:
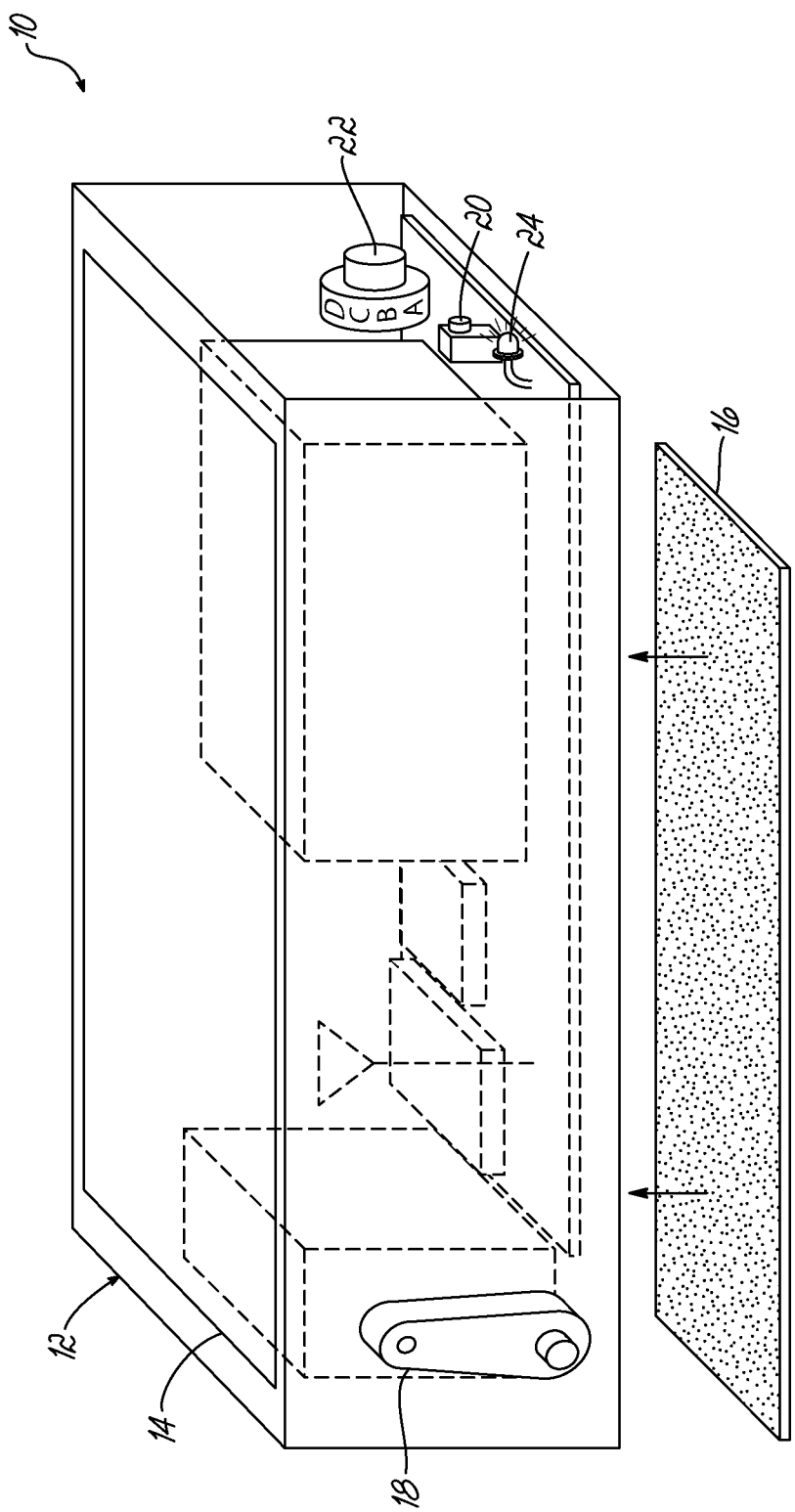
FIG. 1 is an isometric external view of an embodiment of the invention.

Turning attention to FIG. 1, a tactical illusion device 10, is shown as having a chassis 12 enveloping internal components (not shown in this view). The chassis 12 includes an access panel 14 removably affixed to the chassis 12 and configured to facilitate installation of internal components during the manufacturing process and to allow for future service and maintenance of the device 10. In one embodiment of the invention, the access panel 14 may be replaced with, or supplemented with, a sleeve that covers two more sides of the chassis 12. Such a sleeve may be configured to provide moisture or contamination resistance, as well as improving the speed and efficiency of assembly and repair. In other embodiments of the invention, the removable feature of the access panel 14 is disabled by permanently joining the access panel 14 to the chassis during the manufacturing process. This step may be performed to render the device 10 resistant to tampering or to configure the device 10 as a disposable unit. A mounting feature 16 may be used to secure the device 10 to a wall or other surface adjacent to the item or mechanism that will be controlled by the device 10. In one embodiment of the invention, a pressure sensitive adhesive strip (such as the Very High Bond (VHB) line of adhesive tapes manufactured by the 3M® Corporation) may be used. High strength pressure sensitive adhesives allow the device 10 to be rapidly deployed with little surface preparation. In other embodiments of the invention, hook and loop fasteners or detachable brackets may be included.

Once the device 10 is affixed to a surface, an actuator 18 is coupled to the mechanism or object that is to be controlled by the device 10. As will be explained in further detail below, one or more of a plurality of differently configured actuators 18 may be used with the device 10 to adapt the device 10 to various operating environments. In one embodiment of the invention, the plurality of actuators 18 are configured to be selected and changed by a user by use of ordinary hand tools. In another embodiment, the actuators 18 may be interchanged without the use of tools.

A plurality of input and output features are accessible external to the chassis 12. A power selector 20 is available to enable or disable the overall operation of the device 10. Using the power selector 20, the unit may be deactivated during period of disuse to guard against damage to actuators 18 while confined in storage. Additionally, power consumption is reduced or eliminated while the unit is in the off position. While the power selector 20 is depicted as a mechanical pushbutton switch, certain embodiments may use other switch mechanisms as known to one of ordinary skill in the art. In another embodiment, a propriety key is employed to guard against unauthorized use. In yet another embodiment, the power selector 20 is not visible from the external surface of the chassis 12. Rather, a magnetic switch is substituted for a tactile switch to conceal the location of the power selector 20, and to eliminate a potential location for contamination ingress through the chassis 12.

Additionally an interval selector 22 is provided to allow a user to configure operating parameters of the device 10. In one embodiment, a single rotary interval selector 22 is used. In that embodiment, a table of pre-established options for variables is programmed in to device 10. By way of example, crime deterrent program "A" would equate to an average delay of 20 minutes between each of a set of first movements displacing the actuator 18 from a starting position, an average delay of 15 seconds for a second movement of the actuator 18 returning the actuator 18 to the first position, operation only between the hours of 1900 and 0630, and a randomizing function falling within plus or minus 10 percent of the aforementioned variables (percent of an hour when applied to the hours of operation parameter). In lieu of a randomizing function based upon percentage deviation, a fixed quantity may be employed (i.e., plus or minus 45 seconds). Likewise, tactical distraction program "B" would equate to an average delay of 30 seconds between each of a set of first movements displacing the actuator 18 from a first position, an average delay of 7 seconds for a second movement of the actuator 18 returning the actuator 18 to the starting position, operation during all hours of the day, and a randomizing function falling within plus or minus 25 percent of the aforementioned variables.

By way of example, a narrative of program A, above, follows: An activated device 10 had a first movement of one quarter turn clockwise at 1300:00, and a second movement of one quarter turn counterclockwise at 1300:14. It should be noted that many first and second pairs are equal in quantity and opposite in direction, but that need not be the case. The microcontroller 44 (not shown in this view, but shown in FIG. 2 and explained in detail below) selects new first and second movement times based off of the previous first movement time. For example, the next pair of movement times could be been sitting idle since the last movement, which occurred at 1300. The microcontroller selects 1319:00 for the next first movement (which is within 20 minutes, plus or minus 10 percent, from 1300:00) and a next second movement time of 1319:16 (which is 15 seconds, plus or minus 10 percent, from 1319:00).

For ease of implementation, it may be desirable to time subsequent movements off of the immediately preceding movement's time (so that only the time of the immediately preceding movement must be retained by the microcontroller 44). For example, the narrative above would be modified as follows: An activated device 10 still had a first movement of one quarter turn clockwise at 1300:00, and a second movement of one quarter turn counterclockwise at 1300:14. However, the next first movement would be based off of the preceding second movement time. Therefore, adding 19 minutes to 1300:14 yields 1319:14 for the next first movement (in lieu of 1319:00), and adding 16 seconds to 1319:14 yields 1319:30 for the next second movement (in lieu of 1300:14).

In one embodiment, a user turns the interval selector 22 to the desired program letter and activates the device. Other embodiments may allow a user to configure each of the operating variables independently. This may be accomplished by assigning each operating variable to its own rotary encoder or by using other data entry interfaces known to one of ordinary skill in the art (left and right arrows to select a variable, while up and down adjust the numerical value; DIP switches; etc.). These settings allow the device 10 to function with a frequency generally appropriate for a given environment, yet with sufficient variability so as to appear quasi-random when observed by an adversary (as contrasted with light timers and similar predictable devices).

A visual indicator 24 displays the configuration of operating parameters and the status of the device to a user. In one embodiment, an alphanumeric LED or LCD display is employed, while another embodiment may use a single LED light. In the single LED embodiment, the device 10 may indicate its operating program by a pattern of blinking lights that corresponds to the selected program (1 for A, 2 for B, etc.). Alternatively, the visual indicator 24 may only declare if the device 10 is active or disabled, and it may do so with continuous or blinking light. In yet another embodiment, the visual indicator 24 may use an infrared (IR) LED or strobe to indicate operating conditions and to designate that a tactical illusion device 10 is being deployed (visible only to users wearing Night Vision Goggles (NVGs)). Lastly, certain embodiments may allow the visual indicator to be extinguished by the user, so as to lower the chance of visual detection by hostile forces. This may be accomplished by selectably electrically disabling the visual indicator 24, or by using a shutter or cover to selectably conceal the visual indicator 24.

Figure 2:
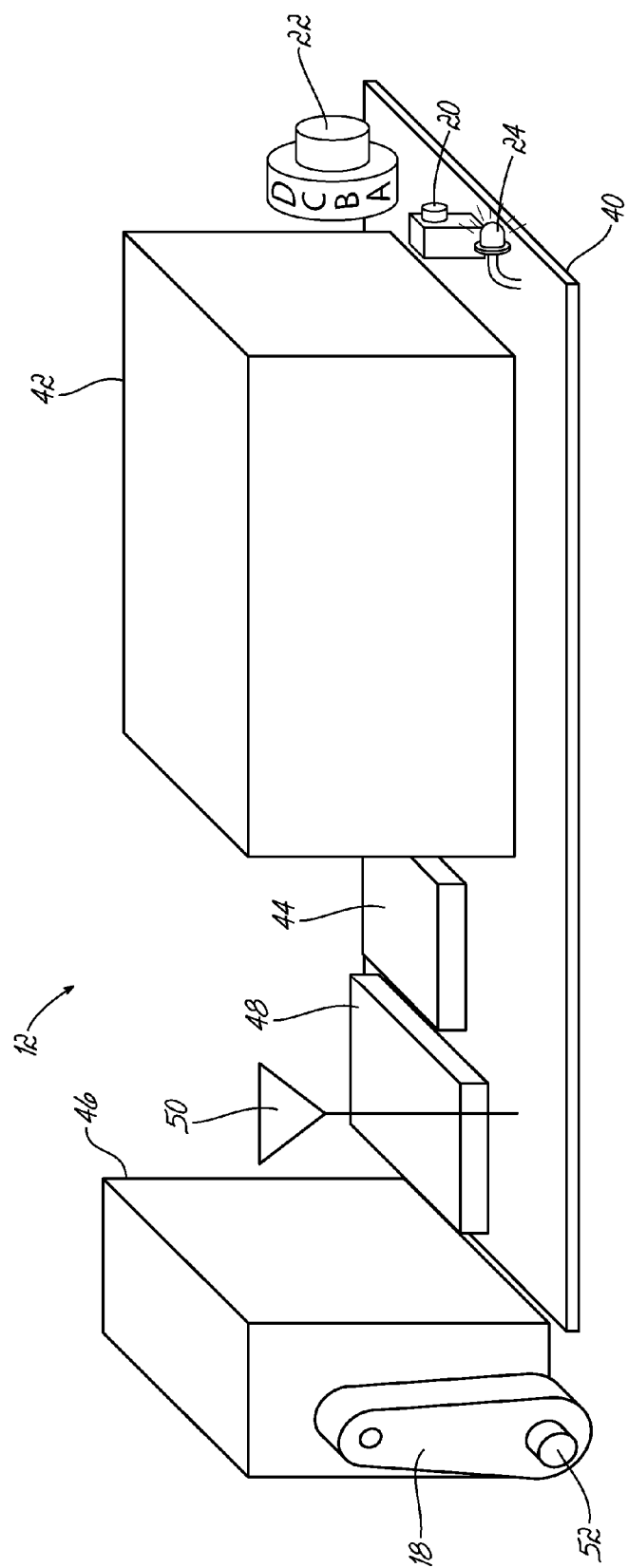
FIG. 2 is an isometric view of a printed circuit board and associated devices of an embodiment of the invention.

In FIG. 2, the chassis 12 has been removed to reveal the internal components of the device 10. A Printed Circuit Board (PCB) 40 forms the physical and electrical connection structure for most of the internal components. Once connections are soldered to the PCB 40, the unit may be lacquered or epoxy coated for moisture and corrosion protection.

A power supply 42 provides an energy source for the device 10. In some embodiments, the power supply 42 is configured to receive alkaline batteries totaling approximately 6 volts. By way of example, a quantity of 4 AAA or AA batteries may be used in series to produce approximately 6 volts. Other embodiments may take advantage of the increased power density and longevity of lithium batteries. For example, the device 10 may use a quantity of 2 CR2 or CR123A lithium batteries in series to also produce approximately 6 volts. The voltage of the power supply may be modified by one of ordinary skill in the art to accommodate variations in connected components. Rechargeable batteries may be employed in a removable configuration, or they may be semi-permanently installed in the device 10 (removed only for the purpose of replacing damaged cells). In semi-permanently installed embodiments, a charging circuit and external power supply may be used to recharge the batteries. It should be noted that the external power supply may be inductively coupled to the device 10, so as to obviate any penetrations in the chassis 22 (thus facilitating water tightness or contamination resistance). Likewise, a solar panel may be used to avoid penetrations in the chassis 12 while allowing the device 10 to be recharged in the absence of public utility service. An A/C adaptor may be used as the power supply 42 for training devices, or other situations where excessive operation will be encountered.

A microcontroller 44 is energized by the power supply 42 and is configured to execute the selected operating parameter program. The microcontroller 44 has a non-volatile memory that is either user-configured with operating parameters, or factory configured with the same. The microcontroller 44 may take input values from the power selector 20 and interval selector 22, and may provide output signals to the visual indicator 24 and prime mover 46 (described in more detail below). In one embodiment of the invention, turning off the power selector 20 interrupts all current to the microcontroller 44 and attached devices. In another embodiment, turning off the power selector 20 maintains power to the microcontroller 44 while interrupting power to other components to conserve energy. In yet another embodiment, turning off the power selector 20 maintains power to all elements, yet instructs the microcontroller 44 to inhibit motion of the prime mover 46.

Some embodiments of the invention also include a Radio Frequency (RF) transceiver 48 and cooperating antenna 50. The RF transceiver 48 may be connected to the microcontroller 44 and may forward commands from a remote control device (not shown) for execution by the microcontroller 44. For example, the RF transceiver 48 may forward signals instructing the microcontroller 44 to activate the prime mover 46, change operating parameters, disable movement of the prime mover 46, etc. The RF transceiver 48 may also transmit operating parameters, battery status, error codes, serial number, and the like to a remote device.

In some configurations of the invention, the RF transceiver 48 may be configured to operate only in a receiving mode (the transmitting function is disabled). By doing so, the device does not emit substantial RF emissions that could allow an adversary to detect the presence of the device 10. When in a receive only mode, the device 10 may be further configured to disable quasi-random movement of the prime mover 46. In such a configuration, the device 10 will only actuate the prime mover 46 upon receiving an appropriate remote command. Selection of the receive only mode may be accomplished by actuation of a physical control on the device 10, by a remote command, by factor programming, or by other means known by one of ordinary skill in the art. As will be appreciated by one of ordinary skill in the art, the circuitry of the RF transceiver may be combined within the same physical package as the microcontroller, or it may be packaged discretely to allow for the omission of the RF feature.

As briefly mentioned above, the prime mover 46 translates the electrical energy of the power supply 42 into physical motion. For the discussions that follow, the motion will be rotary in nature, but linear actuators, solenoids, electromagnets or other means of converting electrical energy to physical motion may be substituted in certain operating environments. The prime mover 46 may be selected from one of two categories dependent upon the desired motion. First, a remote controlled model servo may be used to produce relatively small movements to items or mechanisms connected to the device 10. This shall be referred to as micro-movement. Conversely, a geared DC motor may be used to provide more substantial movement to connected objects or mechanisms. This shall be referred to as macro-movement. For both macro and micro-movement, the prime mover 46 may be configured to be bi-directional. A shaft 52 penetrates the chassis and connects the prime mover 46 to the selected actuator 18.

The actuator 18 of the device 10 may be configured with varying geometries to interface with distinct mechanisms and objects. By way of example, manually operated window shades may have user interfaces (cords, twist rods, and the like) that are a function of a particular style of blind. Typical residential horizontal mini blinds have a single linear cord to raise and lower the array of slats, and a rotary operated rod to adjust the angle of the slats. Likewise, residential horizontal blinds may have a pulley style cord (wherein a loop of cord is presented to the user, and pulling down on a front portion of the loop causes the rear portion of the cord to travel up). Some blinds are situated within the void formed by two panes of glass in a window unit, and a rotary knob protrudes through the interior pane to facilitate adjustment of the slats' angle. The device 10 can accommodate these and other control mechanisms when used with an appropriately configured actuator 18.

Turning attention to FIG. 3A, the device 10 is shown configured to provide micro-movement to the blinds 60 by way of connection to a horizontal slat 62. This micro-motion is intend to mimic the behavior of an individual as he spreads the horizontal slats 62 apart to peek outside. One end of the shaft 52 is affixed with an actuator arm 18a, and the other end of the shaft 52 is connected to a servo type prime mover 46 (not shown). The actuator arm 18a is coupled to a cable 64, which terminates in a clip 66, and the clip 66 is affixed to a horizontal slat 62 of the blinds 60.

Some embodiments of the invention may include a magnetic breakaway 65, wherein a pair of coupled magnets is affixed in series with the cable 64 (or other flexible, rigid, or semi-rigid linkage). If excessive force is applied to the cable 64, the magnetic breakaway 65 will separate to prevent damage to the device 10. Additionally, the magnetic breakaway 65 may be incorporated into a ruggedized model, wherein the chassis 12 is dimensioned to envelop all of the components (excepting a sealable port dimensioned to allow the cable 64 and magnetic breakaway 65 to pass through). The ruggedized unit 10 could be stored with a length of cable 64 and half of the magnetic breakaway 65 contained therein, and a seal would occlude the opening. This configuration omits other penetrations through the chassis 12, and the device 10 would be substantially water and dust-tight.

To deploy the device 10, the seal would be removed, a portion of the cable 64 with half of the pre-terminated magnetic breakaway 65 would be pulled from the chassis 12 and connected with additional cable 64 and mating other half of the magnetic breakaway 65. To obviate other penetrations of the chassis 12, the power selector 20, interval selector 22, or both, may be implemented as reed switches that are activated by passing a portion of the magnetic breakaway 65 in proximity thereto. In lieu of a visual indicator 24, some embodiments cycle the actuator 18 in proximity thereto. While additional benefits of the magnetic breakaway 65 are realized in the ruggedized model, one of ordinary skill in the art will recognize that it may be used in other appropriate situations and configurations.

Upon receiving a first movement command from the microcontroller 44, the prime mover 46 rotates the actuator arm 18a to pull on the cable 64, thus raising the horizontal slat 62. After the requisite delay, the microcontroller 44 gives the prime mover 46 a second movement command, which returns the actuator arm 18a, and interconnected horizontal slat 62 to their starting position.

FIG. 3B shows the device 10 configured to provide micro-movement to the blinds 60 by way of connection to a vertical slat 68. This micro-motion is intend to mimic the behavior of an individual as he spreads the vertical slats 68 apart to peek outside. One end of the shaft 52 is affixed with an actuator arm 18b, and the other end of the shaft 52 is connected to a servo type prime mover 46 (not shown). The actuator arm 18b is coupled to a cable 64, which terminates in a clip 66, and the clip 66 is affixed to a vertical slat 68 of the blinds 60. Upon receiving a first movement command from the microcontroller 44, the prime mover 46 rotates the actuator arm 18b to pull on the cable 64, thus raising the vertical slat 68. After the requisite delay, the microcontroller 44 gives the prime mover 46 a second movement command, which returns the actuator arm 18b, and interconnected vertical slat 68 to, their original positions.

FIG. 4 shows the device 10 configured to provide macro-movement to the blinds 60 by way of collectively raising the horizontal slats 62. This macro-motion is intended to mimic the behavior of an individual as he draws up the blinds 60 for a broad view outside. This macro motions is more radical than then micro motion, and is more likely to draw the attention of an observer. One end of the shaft 52 is affixed with a bobbin actuator 18c, and the other end of the shaft 52 is connected to a geared DC motor type prime mover 46 (not shown). The bobbin actuator 18c is coupled to the linear cord 80 of the blinds 60. Upon receiving a first movement command from the microcontroller 44, the prime mover 46 rotates the actuator arm 18c clockwise to spool the linear cord 80 onto to the bobbin actuator 18c. After reaching a limit of travel, the device 10 stops and waits the required duration of delay. Thereafter, the microcontroller 44 gives the DC motor type prime mover 46 a second movement command, which causes counterclockwise rotation an equal number of revolutions to return the horizontal slats 62 to the starting position. It will be noted by one of ordinary skill in the art, that depending upon location of the device 10, the internal ratcheting cord lock (not shown) of the blinds 60 must be disabled to prevent unintended stoppage.

Figure 5A:
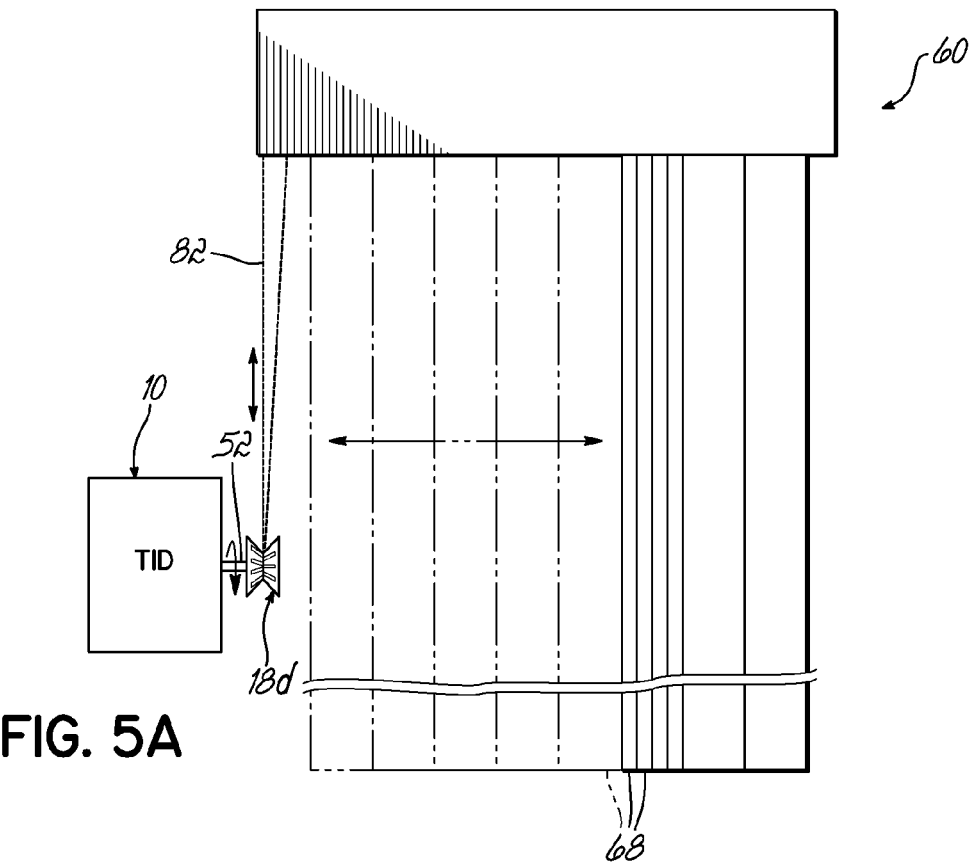
FIG. 5A is an illustration of the interface between an embodiment of the invention configured for pulley style macro movement of blinds.

Turning attention to FIG. 5A, the device 10 is shown configured to provide macro-movement to the blinds 60 by way of collectively parting the vertical slats 68. This macro-motion is intended to mimic the behavior of an individual as he draws the blinds 60 up for a broad view outside. This macro motions is similar in obviousness to that shown in FIG. 4, and is also more likely to draw the attention of an observer. One end of the shaft 52 is affixed with a pulley actuator 18d, and the other end of the shaft 52 is connected to a geared DC motor type prime mover 46 (not shown). A pulley actuator 18d (shown in detail in FIG. 5B) is configured with a ribbed v-groove, such that a pulley cord 82 placed therein creates a frictional engagement capable of positively driving the pulley cord 82. The pulley actuator 18d is coupled to the pulley cord 82 of the blinds 60. Upon receiving a first movement command from the microcontroller 44, the prime mover 46 rotates the actuator arm 18d clockwise to spool the pulley cord 82 onto to the pulley actuator 18d. After reaching a limit of travel, the device 10 stops and waits the required duration of delay. Thereafter, the microcontroller 44 gives the DC motor type prime mover 46 a second movement command, which causes counterclockwise rotation an equal number of revolutions to return the vertical slats 68 to the starting position.

Figure 5B:
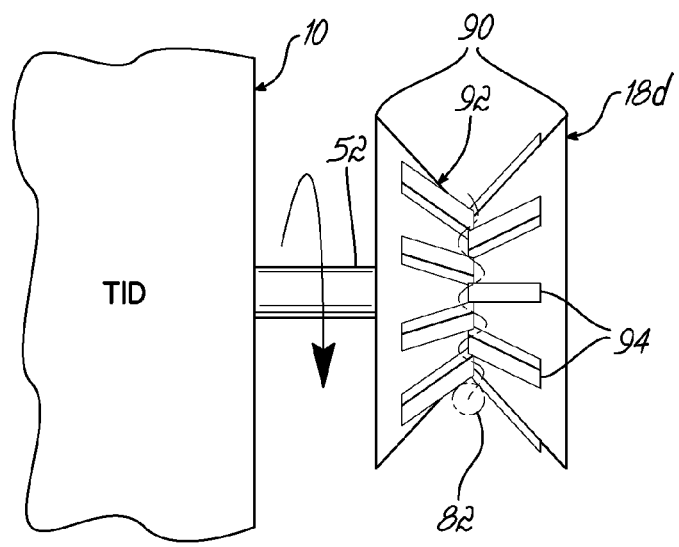
FIG. 5B is a detailed view of a pulley of the invention.

FIG. 5B shows a detailed view of the pulley actuator 18d, having outer flanges 90, a v-groove 92, and alternating ribs 94. When a pulley cord 82 is pulled into radial contact with the pulley actuator 18d, the pulley cord 82 is simultaneously wedged into the v-groove 92 and undulated by the alternating pattern of the ribs 94. This provides sufficient friction to mimic the hand motion of a user manually operating the pulley cord 82.

Figure 6:
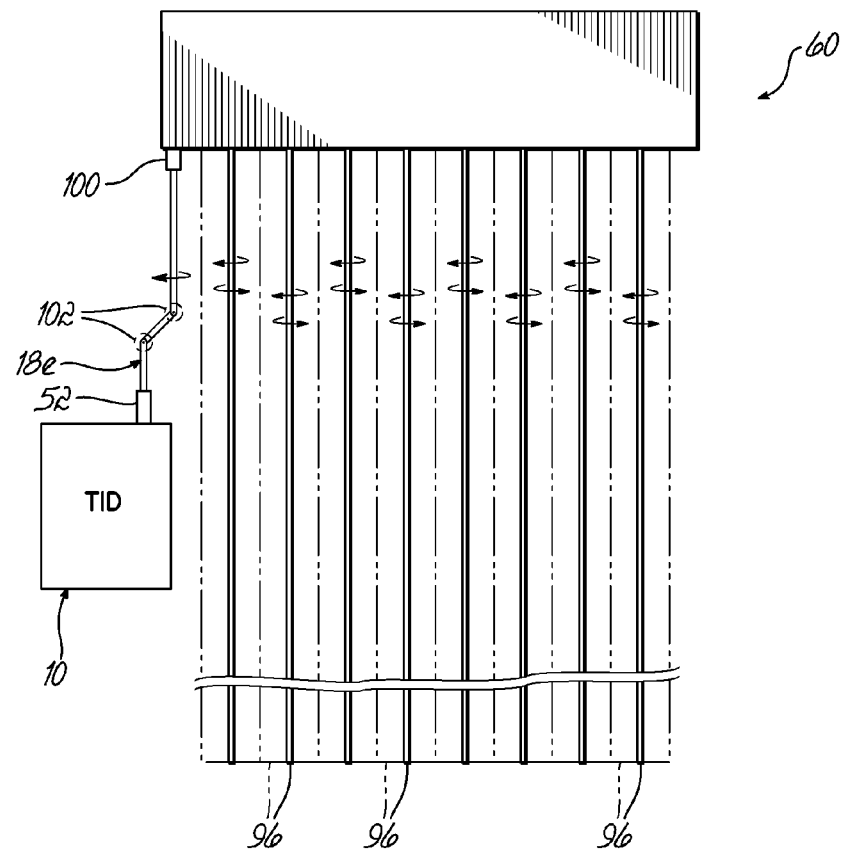
FIG. 6 is an illustration of the interface between an embodiment of the invention and rotary style blind adjustment rod.

FIG. 6 depicts the device 10 shown configured to provide macro-movement to the blinds 60 by way of collectively pivoting the pitch of the blinds 60. This macro-motion is intend to mimic the behavior of an individual as he moves the vertical slats 68 from an overlapping (and occluded position), to a substantially parallel position (wherein one's view is substantially unrestricted in the plane of the parallel vertical slats 68). One end of the shaft 52 is affixed with a universal joint actuator 18e and the other end of the shaft 52 is connected to a geared DC motor type prime mover 46 (not shown). The universal joint actuator 18e is coupled to the rotary adjustment rod 100 of the blinds 60. Additional universal joints 102 may be positions at breaks in the rotary adjustment rod 100 to provide additional degrees of freedom when mounting the device 10. Upon receiving a first movement command from the microcontroller 44, the prime mover 46 rotates the universal joint actuator 18e and cooperating rotary adjustment rod 100 to adjust the angle of the vertical slats 68. After reaching a limit of travel, the device 10 stops and waits the required duration of delay. Thereafter, the microcontroller 44 gives the DC motor type prime mover 46 a second movement command, which causes counterclockwise rotation an equal number of revolutions to return the vertical slats 68 to the starting position. The configuration shown in FIG. 6, may also be coupled to the rotary adjustment knob of blinds that are disposed between two panes of an insulated window unit.

Figure 7:
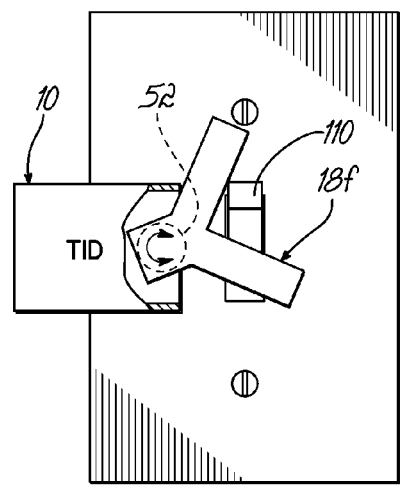
FIG. 7 is an illustration of the interface between an embodiment of the invention and a wall mounted light switch.

While the device 10 is intended to function without external power, the device 10 may also be interfaced with hardwired fixtures that are controlled by conventional wall switches. FIG. 7 shows the device 10 configured with a switch actuator 18f. The V shaped switch actuator 18f may be used to turn on and off conventional toggle switches 110 (single pole double thrown, double pole double throw, etc.) used to turn on hard-wired lights. Rotating the switch actuator 18f clockwise (as viewed from the reader's perspective) will turn the switch 110 on, and counterclockwise conversely. One of ordinary skill in the art will appreciate that with minor adjustments, the actuator 18f may be configured to interface with switches and controls of differing geometries (Leviton Decora®, momentary and continuous pushbutton, thermostat setting adjustment lever, industrial control panel buttons and switches, etc.).

For each of the detailed descriptions, the blinds 60 may be manipulated at the frequency and duration as specified by the user, or may be remotely triggered upon receipt of an appropriate signal by the RF transceiver 48. When multiple devices 10 are deployed, each device may be controlled by independent remote control device, or a single remote control device having a plurality of command buttons. As would be apparent to one of ordinary skill in the art, the device 10 may also be used to manipulate objects unrelated to lights or blinds. For example, a cord attached to the device could be used to remotely knock a vase off of a table or to remove the pin from a pyrotechnic device (objects manipulated by the device 10 may be referred to as illusion targets). Doors and gates could be moved to confuse hostile forces and small objects can be pulled between concealment and open battle space for the same impact. The illusion of occupancy need not be limited to providing the illusion of human presence in structures. Rather it can include any desired operating environment, to include fenced and unfenced land, vehicles, aircraft, watercraft, etc.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. An apparatus for providing an illusion of occupancy, the apparatus comprising:
   a prime mover having a shaft configured to receive an actuator,
   an actuator configured to interface the prime mover to an illusion target,
   a microcontroller having a memory operatively coupled to selectably operate the prime mover, wherein the microcontroller is configured with a first value representing an average time between a plurality of first movements of the prime mover, a second value representing an average time between the first movement and a second movement of the prime mover, and a third value representing a quantity of random variability to be applied to the first value and the second value; and
   wherein the microcontroller is configured to operate the prime mover in accordance with the first value, the second value, and the third value, thereby manipulating the illusion target and providing the illusion of occupancy.

2. The apparatus of claim 1, wherein the prime mover is a DC motor.

3. The apparatus of claim 1, wherein the prime mover is a servo motor.

4. The apparatus of claim 1, wherein the prime mover is a linear actuator.

5. The apparatus of claim 1, wherein the prime mover is a solenoid.

6. The apparatus of claim 1, wherein the prime mover is an electromagnet.

7. The apparatus of claim 1, wherein the third value is a percentage limit of deviation applied to the first value and the second value.

8. The apparatus of claim 1, further including a chassis having a sealable port, the chassis being configured to render the apparatus substantially water and dust-tight.

9. The apparatus of claim 1, wherein said actuator is a v-notched pulley having a plurality of projections on opposing contact surfaces, wherein the actuator is further configured to provide a frictional drive engagement with a cooperating cord.

10. The apparatus of claim 1, wherein said actuator is configured to interface with a conventional double throw light switch.

11. The apparatus of claim 1, further including a linkage having a magnetic breakaway coupled to the actuator and configured for additionally coupling with the illusion target.

12. The apparatus of claim 1, further comprising an interval selector operably coupled to the microcontroller and configured to adjust the first value, the second value, or the third value.

13. The apparatus of claim 12, further comprising a display device electrically coupled to the microcontroller and configured to display the first value, the second value, the third value, or an operational status of the apparatus.

14. The apparatus of claim 13, further comprising an RF transceiver operably coupled to the microcontroller, wherein the RF transceiver is configured to forward a command from a remote device to the microcontroller, and wherein the microcontroller is configured to initiate motion of the prime mover in response thereto.

15. The apparatus of claim 13, wherein the second movement is opposite in direction, and equal in quantity to the first movement.

16. The apparatus of claim 13, wherein the first value, second value, or the third value is selected by a user from a variety of pre-established options.

17. The apparatus of claim 13, wherein one of the first value, the second value, or the third value is manually selected by a user.

18. The apparatus of claim 14, wherein said RF transceiver is further configured to receive a new first value, new second value, and new third value from the remote device, and wherein said microcontroller is configured to replace the first value, second value, and third value with the new first value, the new second value, and the new third value, respectively.

19. The apparatus of claim 15 wherein said RF transceiver is configured to transmit signals indicative of power supply level, an error code, serial number, first value, second value, or third value to the remote device.

20. A method of providing an illusion of occupancy within an operating environment, the method comprising:
  selecting an illusion target for manipulation within the operating environment;
  choosing a first value representing an average time between a plurality of first movements of the illusion target, a second value representing an average time between the first movement and a second movement of the illusion target, and a third value representing a quantity of random variability to be applied to the first value and the second value;
  manipulating the illusion target irrespective of actual human occupancy in the operating environment, in accordance with the first value, the second value, and the third value, thereby providing the illusion of occupancy.

* * * * *